(12) United States Patent
Bindzus et al.

(10) Patent No.: US 6,461,656 B1
(45) Date of Patent: Oct. 8, 2002

(54) STARCH PHOSPHATE ESTER FOR USE AS AN EXPANSION AID

(75) Inventors: Wolfgang Bindzus, Hillsborough; Paul A. Altieri, Belle Mead, both of NJ (US)

(73) Assignee: Natinal Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/771,417

(22) Filed: Jan. 26, 2001

(51) Int. Cl.$^7$ ................................................. A21D 6/00
(52) U.S. Cl. ................ 426/242; 426/557; 426/558; 426/578; 426/520; 426/293; 426/330; 426/661; 426/549; 126/70; 126/33; 536/109
(58) Field of Search .................. 426/578, 661, 426/520, 303, 293, 549, 242, 557; 126/70, 33; 536/109

(56) References Cited

U.S. PATENT DOCUMENTS

| | | | |
|---|---|---|---|
| 2,884,413 A | * 4/1959 | Kerr et al. | 536/109 |
| 3,054,677 A | 9/1962 | Graham | 99/82 |
| 3,462,277 A | 8/1969 | Reinhart | 99/81 |
| 3,843,377 A | 10/1974 | Alexander et al. | 106/157 |
| 3,966,990 A | 6/1976 | Cremer et al. | 426/550 |
| 4,166,173 A | 8/1979 | Wurzburg et al. | 536/109 |
| 4,216,310 A | * 8/1980 | Wurzburg et al. | 436/109 |
| 5,165,950 A | * 11/1992 | Boehmer et al. | 426/559 |
| 5,480,669 A | 1/1996 | Zallie et al. | 426/549 |
| 5,980,967 A | * 11/1999 | Carey et al. | 426/560 |
| 6,242,033 B1 | * 6/2001 | Sander | 426/559 |

OTHER PUBLICATIONS

U. S. patent application Ser. No. 09/633,832, Bindzus et al., filed Aug. 7, 2000.

Bhattacharyya, D. Singhal, R. S. and P. R. Kulkarni: Carboxymethyl Starch: An Expansion Aid. Carbohydrate Polymer 31 (1996), pp. 79–82.

Fast, et. al. "Breakfast Cereals and How They Are Made", American Association of Cereal Chemists, Inc. $2^{nd}$ ed. pp. 214–278, 2000.

Harper, J.M. and R.E. Tribbelhorn: Expansion of Native Cereal Starch Extrudates. In: Food Extrusion Science and Technology, eds: J.L. Kokini, Chi Tang Ho and M.V. Karwe, Marcel Dekker, Inc., 1992, pp. 653–666.

Wang, S.W.: Starches and Starch Derivatives in Expanded Snacks. Cereal Foods World 42 (1997), pp. 743–745.

Kokini, J.L., Chang, C.N. and L.S. Lai: The Role of Rheological Properties on Extrudate Expansion. In: Food Extrusion Science and Technology, eds: J.L. Kokini, Chi Tang Ho and M.V. Karwe, Marcel Dekker, Inc., 1992, pp. 631–652.

Chinnaswamy, R.: Basis of Cereal Starch Expansion. Carbohydrate Polymers 21 (1993), pp. 157–167.

* cited by examiner

Primary Examiner—Nina Bhat
(74) Attorney, Agent, or Firm—Ellen T. Dec, Esq.

(57) ABSTRACT

The present invention is directed to the use of starch phosphate esters as an expansion and/or texture aid in food or industrial products. The invention further provides the formulations and improved expanded products containing starch phosphate esters, particularly extruded breakfast cereals and snacks.

18 Claims, No Drawings

STARCH PHOSPHATE ESTER FOR USE AS AN EXPANSION AID

FIELD OF THE INVENTION

The present invention is directed to the use of starch phosphate esters as an expansion and/or texture aid in food or industrial products. The invention further provides the formulations and improved expanded products containing starch phosphate esters, particularly extruded breakfast cereals and snacks.

BACKGROUND OF THE INVENTION

Expansion is an important characteristic of a number of materials and is useful in a number of applications, including the preparation of sheets, shaped foam and loosefill products as well as in the preparation of food products. Food products in which expanded materials are useful include pasta, pet food, breakfast cereals and snacks. The expansion of food products is accomplished by a variety of means including extrusion, puffing, frying and baking.

The expansion processes which are used for making expanded products affect the physical and structural properties of starch. Under the process conditions of known food expansion, starch undergoes a melting, plasticizing and/or gelatinizing process. The structure of starch polymers in the plasticized or gelatinized state influence the product characteristics of expansion, crispness, bite, puff and texture as well as product-specific attributes such as the bowl life of cereals.

Another important parameter is the relative amylose-amylopectin content of starch. Amylose is known to provide crunchiness and strength in expanded products, whereas increased amylopectin content typically results in a product with increased expansion, crispness and puffiness.

Starches have been modified with the objective of affecting the expansion and texture of expanded products. For instance, pregelatinized starches have been used where the process conditions do not allow for complete gelatinization or complete disintegration of the granular structure of the starch. Wang, S. W.: Starches and Starch Derivatives in Expanded Snacks, Cereal Foods World, Vol. 42, pg 743–745 (1997). In addition, crosslinked starches have been used under high shear conditions in order to reduce otherwise severe fragmentation of the starch polymers. Id.

Further, starches which have been modified to provide cold water soluble attributes are known to improve the expansion and texture of final expanded products. Such cold water soluble starches include hydroxypropylated or carboxymethylated starches. See U.S. Pat. No. 3,9566,990; Bhattacharyya, D., Singhal, R. s. and P. R. Kulkarni: Carboxymethyl Starch: an Expansion Aid, Carbohydrate Polymers 31, 79–82 (1996); and U.S. Pat. No. , 5,480,669. Resistant starches have also been used to affect the expansion of food products. Id. While phosphorylated starches have been described for use in food products, they have not been described as an expansion aid.

Starch phosphate monoesters have been described for use in a variety of food products, particularly as viscosifiers in order to improve texture and stability of non-expanded food. In particular, U.S. Ser. No. 09/633,832, the disclosure of which is incorporated herein by reference, describes the use of starch phosphate monoesters in protein-containing, low to intermediate moisture foods to improve the taste, texture, color and moisture retention of such foods. Texture, in this case, refers to the texture of the food that is strongly affected by improved retention of moisture content during storage of the starch phosphate monoester-treated food product.

Surprisingly, it has now been discovered that, irrespective of the amylose/amylopectin content of the native starch structure or modification of the native starch structure, starch phosphate monoesters may be advantageously used as expansion aids in foods, particularly breakfast cereals and snacks.

SUMMARY OF THE INVENTION

The present invention is directed to the use of starch phosphate esters as an expansion and/or texture aid in food or industrial products. The invention further provides the formulations and improved expanded products containing starch phosphate esters, particularly extruded breakfast cereals and snacks.

DETAILED DESCRIPTION OF THE INVENTION

The present invention is directed to the use of starch phosphate esters as an expansion and/or texture aid in food or industrial products. The invention further provides the formulations and improved expanded products containing starch phosphate esters, particularly extruded breakfast cereals and snacks.

All starches and flours (hereinafter "starch") may be suitable for use herein and may be derived from any native source. A native starch or flour as used herein, is one as it is found in nature. Also suitable are starches and flours derived from a plant obtained by standard breeding techniques including crossbreeding, translocation, inversion, transformation or any other method of gene or chromosome engineering to include variations thereof. In addition, starch or flours derived from a plant grown from artificial mutations and variations of the above generic composition which may be produced by known standard methods of mutation breeding are also suitable herein.

Typical sources for the starches and flours are cereals, tubers, roots, legumes and fruits. The native source can be corn, pea, potato, sweet potato, banana, barley, wheat, rice, sago, amaranth, tapioca, arrowroot, canna, sorghum, and waxy or high amylose varieties thereof. A used herein, the term "waxy" is intended to include a starch or flour containing at least about 95% by weight amylopectin and the term "high amylose" is intended to include a starch or flour containing at least about 40% by weight amylose.

Conversion products derived from any of the starches, including fluidity or thin-boiling starches prepared by oxidation, enzyme conversion, acid hydrolysis, heat and or acid dextrinization, and or sheared products may also be useful herein.

Chemically modified starches may also be used, provided such modification does not destroy the granular nature of the starch. Such chemical modifications are intended to include, without limitation, crosslinked starches, acetylated and organically esterified starches, hydroxyethylated and hydroxypropylated starches, phosphorylated and inorganically esterified starches, cationic, anionic, nonionic, and zwitterionic starches, and succinate and substituted succinate derivatives of starch. Such modifications are known in the art, for example in Modified Starches: Properties and Uses, Ed. Wurzburg, CRC Press, Inc., Florida (1986).

The starch phosphate monoesters used in the formulations of the present invention may be prepared via methods known in the art. Traditional preparations of starch phosphate monoesters are described in U.S. Pat. No. 4,166,173, the disclosure of which is incorporated herein by reference. These preparations generally require the impregnation of the base starch with an alkali-metal phosphate, drying to a moisture content of less than 20% and heating in a continuous cooker, dextrinizer, convection oven or vacuum oven to effect the phosphorylation.

Additional methods of preparing starch phosphate monoesters using fluidizied bed methodology are described in U.S. Pat. No. 3,843,377 and WO 99/64467, the disclosures of which are incorporated herein by reference. These methods disclose the use of a fluidized bed reactor in order to heat treat and phosphorylate starch in the presence of urea under semi-dry conditions of less than 5% moisture at temperatures of between 100° C. to 175° C. for between 20 to 60 minutes.

The term "starch phosphate monoester" is intended to include, without limit, all equivalent terms, known to one of ordinary skill in the art, such as monostarch phosphate and includes regulatory definitions. Regulatory definitions of starch phosphate monoesters for use in food are often defined by the method in which they are made. In Europe, for example, a monostarch phosphate is defined to be a starch esterified with ortho-phosphoric acid or sodium or potassium ortho-phosphate or sodium tripolyphosphate. In the United States, a starch phosphate monoester is a food starch esterified by sodium trimetaphosphate or sodium tripolyphosphate and sodium trimetaphosphate.

A particularly suitable method of preparing the starch phosphate monoesters of the present invention employs the fluidized bed technology described in U.S. Ser. No. 09/633,832. This application describes a process of impregnating the desired starch with a phosphate reagent, and optionally, an oligosaccharide. While in a fluidized state, the impregnated starch is then dried to a virtually anhydrous state, preferably 1 percent by weight of the starch or less, and then heated treated to effect phosphorylation. The impregnation of the starch by oligosaccharide and phosphate reagent may be done in any order. The pH of the resultant slurry may then adjusted to between about 3 and 12, preferably to between about 6 and 9.5.

"Phosphate reagent" as used this particularly suitable method is defined as any phosphate reagent used for phosphorylating starch including ortho-, pyro-, meta- or tripolyphosphates. Illustrative phosphate reagents are the alkali metal phosphates such as sodium and potassium orthophosphate, phosphoric acid, phosphorus oxychloride, sodium and potassium tripolyphosphate and sodium and potassium trimetaphosphate. The reagent may be either a mono-, di- or trialkyl metal phosphate or combinations thereof.

Impregnation by the phosphate reagent may be accomplished by adding the reagent in an amount of less than about 15% by weight of starch, preferably less than about 10%. The phosphate reagent may be added in the dry state to wet starch granules, or by dissolving the reagent in water to form an aqueous solution which is then mixed with the starch granules. These impregnation techniques are described in U.S. Pat. Nos. 4,166,173 and 4,216,310 which are incorporated herein by reference.

The optional use of oligosaccharide in the preferred method of making the starch phosphate monoesters may include the addition of any oligosaccharide. The source may be the same as or different from that of the starch component and may be derived from any native source, including those listed above. As defined herein, oligosaccharide contains from one to twenty sugar units joined by glycosidic bonds. Oligosaccharide is intended to include monosaccharides, disaccharides, oligosaccharides, corn syrup solids, and maltodextrins. Oligosaccharides suitable for the present invention include, but are not limited to, debranched starches, corn syrup solids, dextrose, fructose, maltose, particularly corn syrup solids with a DE of from about 20 to 40. Although oligosaccharide is intended to include monosaccharides, these generally add color and/or flavor which may be undesirable in many industrial applications. Therefore, particularly suitable oligosaccharides for the present invention are those which contain at least two sugar units joined by glycosidic bonds.

In the preferred method of preparing starch phosphate monoesters, the optional addition of the oligosaccharide to the starch may be achieved by adding the oligosaccharide either dry or as an aqueous solution. In particular, the oligosacchrides may be added to an agitated starch slurry or starch may be added to a stirred, aqueous solution of oligosaccharide. In addition, an aqueous solution of the oligosaccharide may be sprayed onto dry or wet starch granules.

According to the preferred preparation, the impregnated starch, impregnated with phosphate and optionally with oligosaccharides, is then subjected to a fluidized state and heat treated to effect the phosphorylation. Though the heat treatment may be carried out in one step, it is preferably carried out in two steps. First, the impregnated starch is subjected to the fluidized state and dried to virtually anhydrous conditions, particularly to less than about 1% moisture content by weight of starch, at less than about 140° C., particularly between 60° C. and 140° C., and most particularly between about 100° C. to about 125° C. Secondly, while still in the fluidized state, the dried product is heated to between about 100° C. to about 185° C., particularly between about 120 to about 140° C. for between about 30 to about 300 minutes. At temperatures higher than about 150° C., the processing time is preferably less than about 45 minutes.

The fluidized state is achieved by vigorous mixing of the solid starch particles in vacuum or in a gas whereby a uniform distribution of starch throughout the vacuum or gas may be attained. Vigorous mixing may be accomplished by using air or gas, at or above atmospheric pressures in a fluidized bed reactor or by sufficient mechanical agitation. Where pressurized gas is used to effect the fluidized state, the velocity of the gas must achieve a minimum rate such that the particles are free to move and exhibit a "fluidized state." The fluidized state results in very efficient heat transfer and allows the starch to rapidly dry to a virtually anhydrous state at low temperature. Drying and heating the impregnated starch under fluidized conditions results in starch phosphate monoesters with high reaction efficiency, high levels of substitution and low levels of residual inorganic phosphate salt.

The starch phosphate monoester, preferably prepared according to the foregoing method, is then incorporated into a formulation suitable for use in expandable food products such as extruded breakfast cereals or snacks. Formulations containing about the starch phosphate monoester in the amounts of from about 0.1 to 50%, by weight of the formulation, more particularly from about 1 to 25% by weight and especially particularly from about 5 to about 20% show significant increases in expansion over formulations which substitute the non-derivatized native starch for the starch phosphate monoester. Increasing the content of starch phosphate monoester content in the formulation also increases the degree of expansion of the formulation.

Extruded foods in which the starch phosphate monoesters may be advantageously incorporated include pasta, snacks, breakfast cereals and pet foods, particularly breakfast cereal and snack foods and most particularly in low moisture, ready-to-eat cereals and snacks. Formulation content or processing parameters may be adjusted according to principles well-known in the industry in order to achieve properties, such as degree of expansion, taste and sweetness, specific to the desired end product. Generally formulations may contain whole or partially milled grains and flours including corn, wheat oat, rice and barley, native or modified starch as described previously herein, sucrose, maltodextrins, corn syrup solids, other sweeteners and salt. Optional additives may include acidifier, antiforaming agents, antioxidants, binders/extenders, legumes, mold inhibitors, nuts, phosphate and other food chemcals, spices and herbs, and vegetables.

The amount of starch phosphate monoester which can be added and used in any given food will also be determined by the amount that can be tolerated from a functional standpoint. In other words, the amount of starch phosphate monoester used generally will be as high as will be acceptable in organoleptic evaluation of the food. Generally the starch phosphate monoester may be used in food applications at about 0.1 to 50%, by weight of the food, more particularly from about 1 to 25% by weight and especially particularly from about 5 to about 20%.

The formulation can be processed by the use of any known technique suitable for expanding food products such as extrusion, puffing, frying, gun puffing, air impingement and baking. Conventional cooking-extruder expansion processes and equipment such as those disclosed in U.S. Pat. No. 3,054,677, 3,462,277 and Fast & Caldwell may be used to expand such formulations to give a breakfast cereal or snack product. See Fast, R. B., Caldwell, E. F., Breakfast Cereals and How They are Made, Amer. Asso. Of Cereal Chem., Inc., $2^{nd}$ ed. pg 215–278 (2000). Expansion techniques which do not require extrusion are intended to be included in this invention.

In such processes requiring extrusion, a mixture of the formulation and water is processed in a cooker-extruder in which high pressure, temperature, and shear is generated. Under these process conditions, the formulation is melted, plasticized and/or at least partially gelatinized. The resultant material is expelled through a constricted opening, e.g. through a plurality of dies, under high temperature and pressure conditions.

Depending upon the process conditions, the material may be either directly or indirectly expanded. Direct expansion occurs when the process conditions result in instantaneous water evaporation and cooking of the product. Indirect expansion is achieved by processing the material, sometimes known as a half product, via known post-extrusion processes including frying, baking and microwave heating.

To achieve a directly expanded product, temperature and pressure ahead of the dies are maintained high enough to cause sudden release of pressure when the plasticized material is forced through the dies, with sudden conversion of at least some of the moisture to steam in the extruded material to develop bubbles in the resulting product. The development of bubbles and simultaneous cooling process creates a "foam type" of cell structure which defines the morphology of the expanded product. The expansion of the formulation is thus sensitive to moisture content in the extruder which in turn affects the energy required to extrude the formulation.

Moisture content in this context refers to the total water content by weight present in the extruder during extrusion, including the water content of the formulation and water added during extrusion. For the production of directly expanded products extruder total moisture content is generally in the range of from about 10% to about 30%, particularly from about 15 to about 20% and most particularly from about 17% to about 19%. For indirect expansion, total extruder moisture contents of up to 45% may be utilized.

Expansion of the extruded products of this invention may be measured directly by measuring the dimensions of the product, or indirectly by measuring the bulk density of the product. These analytical methods are known in the art and described for example by Harper & Tribbelhorn. See Harper, J. M. and R. E. Tribbelhorn, Expansion of Native Cereal Starch Extrudates, Food Extrusion Science and Technology, Marcel Dekker, Inc., pg 653–666, (1992). Bulk density refers to the weight of the extruded product in a known volume and is inversely related to the degree of expansion measured directly.

The present inventive formulation provides an expanded product which expands significantly even under variable extruder conditions such as total water content. For instance, an expanded corn starch phosphate monoester formulation provides an expanded product having a bulk density of 0.29 g/ml and 0.36 g/ml at extruder total water contents of 17% and 19%, respectively. This degree and type of expansion is much superior to the formulations containing the corresponding native corn starch which have high bulk densities of 0.51 g/ml and 0.55 g/ml produced at water contents of 17 and 19%, respectively.

The following examples are presented to further illustrate and explain the present invention and should not be taken as limiting in any regard. All parts and percentages are given by weight and all temperatures in degrees Celcius (° C.) unless otherwise noted.

EXAMPLES

Measurement of bound phosphorus on starch: The phosphorus content of starch samples was measured on acid-hydrolyzed starch samples by Inductive Couple Plasma—Atomic Emission ("ICP—AE") Spectroscopy.

Measurement of bulk density: A known mass of an extruded and expanded formulated starch sample was introduced into a 500 ml beaker, and the volume of the sample determined. The bulk density was then obtained by dividing the measured mass (in grams) of the extruded product by the defined volume (in mls).

Example 1

Preparation of the Starch Phosphate Monoester

This example describes the preparation of starch phosphate monoesters useful in the formulations of the present invention.

The starch phosphate monoesters ("SPM") were prepared according to the method described in U.S. Pat. Ser. No. 09/633,832, incorporated herein by reference. Native starches ("NS") which were used in the comparison formulations of Examples 1–4 and for the preparation of the corresponding starch phosphate monoesters included a high amylose corn starch (Sample I, HYLON® VII commercially available from National Starch and Chemical Co.), a waxy corn starch (Sample II, commercially available from National Starch and Chemical Co.), a potato starch (Sample III, commercially available from Emsland Staerke—

Germany), and a wheat starch (Sample IV, commercially available from Midwest Grain Products Inc.).

Impregnation of the starch with sodium tripolyphosphate was carried out using the following slurry impregnation method. One part native starch is slurried in two parts water by weight. The pH of the native starch slurry was adjusted to between 6.0 and 6.5 with HCl and stirred for 30 minutes. The slurry was then de-watered on a Buchner funnel and impregnated with a 3–10% aqueous sodium tripolyphosphate solution adjusted to a pH of between 6.0 to 6.5 to afford 2% sodium tripolyphosphate (anhydrous weight) impregnated starch cake.

The impregnated starch (about 4 kg) was air dried to a moisture content of about 10–12%, ground, then dried in a pre-heated fluid bed reactor at a temperature of 220° F. until the starch had a moisture content of less than 1.0%. The dried starch was then heated to a temperature of 300° F. for 30 minutes, resulting in bound phosphorus levels of between 0.25 to 0.50% by weight.

Example 2

Expansion of Starch Phosphate Monoester-Containing Formulations

This example illustrates the superior expansion of cereals formulated with the starch phosphate monoesters of Example 1 over cereals formulated with the corresponding native starch.

Cereals were formulated with the starch phosphate monoester ("SPM") and corresponding native starch ("NS") samples of Example I in the following proportions: 70% oat flour, 10% sugar, 5% corn flour and 15% starch sample. Cereals were formulated without starch in the following proportions: 70% oat flour, 10% sugar and 20% corn flour.

The extrusion experiments were carried out on a co-rotating twin screw extruder (available from Werner & Pfeiderer) under the following conditions: screw design was chosen to provide medium shear; the screw speed was 250 rpm; L/d-ratio 21; the die diameter was 2×3 mm; water content was 17%; the feed rate was 13 kg/h, the barrel temperature was set to 60° C. in the mixing zone, to 150° C. in the heating/cooking zone, and the die plate was heated to 140° C.; and the die face cutter had 2 blades.

The extruded product was cut at the die and air dried. Bulk density refers to the weight of the extruded product in a known volume. The results are presented in Table 1.

TABLE 1

Bulk density of extruded formulations containing native and phosphorylated starches

| Sample | % bound phosphorus on SPM (by weight) | NS formulation Bulk density (g/ml) | SPM formulation Bulk density (g/ml) |
|---|---|---|---|
| Sample I | 0.25 | 0.51 | 0.33 |
| Sample II | 0.25 | 0.36 | 0.27 |
| Sample III | 0.50 | 0.37 | 0.28 |
| Sample IV | 0.46 | 0.56 | 0.46 |
| No starch in formulation | Formulation Bulk Density = 0.51 g/ml | | |

It is common knowledge that expansion is inversely related to the bulk density of the extruded cereal products. The data in Table 1 show that, the formulations of the present invention, prepared with the starch phosphate monoesters ("SPM"), demonstrate significantly improved expansion over formulations containing the corresponding native starch ("NS") as reflected in the lower bulk density of the expanded cereal products of the present invention. This is true irrespective of the botanical source of the starch phosphate monester sample.

Example 3

Expansion of Formulations of Varying Water Content

This example demonstrates the ability of the starch phosphate monoesters to improve the expansion of cereal formulations irrespective of extrusion variables such as the extrusion total water content.

At a total extruder water content of 17%, the cereal formulation of native corn starch ("NS") prepared according to Example 2 was extruded to form an expanded product having a bulk density of 0.51 gm/ml. At a water content of 19%, the extruded NS formulation expanded providing a product with a bulk density of 0.55 g/ml.

In comparison, the corresponding phosphorylated corn starch, prepared according to Example 1 (0.32% bound phosphorus by weight) ("SPM") formulation showed improved expansion over the native corn starch formulation at both total extruder water content levels. At 17% total extruder water content, the SPM formulation provided an expanded product having a bulk density of 0.29 g/ml, and at water content of 19%, a product having a bulk density of 0.36 g/ml. Thus, even though the SPM formulations display a increase in bulk density when higher extruder water contents are used, the expansion of the SPM formulation is still superior to that of the NS formulation.

Accordingly, the improved expansion of the cereal formulations containing the starch phosphate monoester occurs despite variation in extruder variables such as total water content.

Example 4

Expansion Over a Range of Starch Phosphate Monoester Content

The example illustrates the superior expansion of cereal formulations containing from 5 to 15% over the starch phosphate monoester as compared to formulations containing the native starch.

Formulations were prepared containing Hylon® VII starch phosphate monoester having a bound phosphorus level of 0.34%, prepared according to the method of Example 1 and compared to formulations containing Hylon® VII, the corresponding, non-phosphorylated native starch. The formulations are reported in Table 2 below.

TABLE 2

| | Cereal Formulations (% wt) | | |
|---|---|---|---|
| Ingredient | 5% Starch* | 10% Starch* | 15% Starch* |
| Oat flour | 70% | 70% | 70% |
| Sugar | 10% | 10% | 10% |
| Corn flour | 15% | 10% | 5% |

Starch* is either Hylon ® VII starch or Hylon ® VII starch phosphorylated to a level of 0.34%

The formulations were extruded and expanded according to the method described in Example 2. As reported in Table 2, at 5% the phosphorylated starch formulation expanded to give a bulk density of 0.465 g/ml compared to the native starch value of 0.481 g/ml. At 10% phosphorylated starch content the bulk densities of the expanded formulations were 0.370 g/ml, 0.437 g/ml; and at 15% the bulk densities were 0.332 and 0.405 g/ml for the phosphorylated starch and native starch, respectively.

Therefore, the starch phosphate monoesters provide a consistently improved expanded cereal formulation, even at low levels of formulation content.

Example 5

Expansion of Starch Phosphate Monoesters Compared to the Expansion of Other Derivitized Starches This example illustrates the unexpectedly superior expansion of formulations containing the phosphorylated starch ("starch phosphate monoester) which had very little cold water swelling capacity as compared to carboxymethylated or hydroxypropylated starch, both of which demonstrate a high degree of cold water swelling.

Hylon® VII Starch was phosphorylated according to the method described herein in Example 1 (0.44% bound phosphorus). For comparison purposes a carboxymethylated sample of Hylon® VII Starch having a carboxyl group content of 3–3.5% by weight was also prepared according to the method described in Rutenberg, et al. which is incorporated herein by reference. Rutenberg, M. W. and D. Solarek: Starch Derivatives: Production and Use P. 312–388 in: Starch—Chemistry and Technology, pg 312—388, Academic Press (1984). Briefly, Hylon® VII Starch was slurred in alcohol at 35% solids. Then 15% by weight of the starch of a 50% sodium hydroxide solution was added to the slurry and incubated for 10–30 minutes. After heating the slurry to 70° C., 15% (weight on starch) sodium salt of chloroacetic acid was added to the slurry. After stirring for 18 hours the reaction mixture was cooled to room temperature and the pH adjusted to neutral. The carboxymethylated starch was then filtered out of solution, washed with an alcohol/water mixture and dried.

In addition, a hydroxypropylated sample of Hylon® VII Starch having a bound hydroxypropyl group content of 3–3.5% by weight was also prepared according to the method described in Rutenberg et al. as well as U.S. Pat. No. 4,863,655, which is incorporated herein by reference. Id.

Each derivatized starch was mixed into a cereal formulation of 10% derivatized starch, 10% sugar, 10% corn flour and 70% oat flour and expanded according to the procedure described herein in Example 2. The measured bulk densities for the expanded formulations of phosphorylated (starch phosphate monoester), hydroxypropylated and carboxymethylated Hylon®VII were 4.36 g/ml, 5.74 g/ml and 0.620 g/ml, respectively.

Thus, the expanded formulation containing phosphorylated Hylon® VII Starch advantageously displayed a lower bulk density as compared to other derivatized starches known in the art, despite the fact that the phosphorylated sample displays none of the cold water swelling properties believed to aid the hydroxypropylated and carboxymethylated derivatives in their expansion properties.

We claim:

1. A process for expanding food comprising
   expanding a formulation containing a starch phosphate monoester.

2. The process of claim 1 further comprising extruding the formulation.

3. The process of claim 1 wherein the starch phosphate monoester is prepared by
   (a) impregnating a starch with a phosphate reagent to form an impregnated starch;
   (b) drying the impregnated starch to a virtually anhydrous state; and
   (c) heating to form a starch phosphate monoester.

4. The process of claim 3 wherein the impregnated starch of step (b) is dried in a fluidized bed reactor.

5. The process of claim 2 wherein the extruded formulation is expanded by a means selected from the group consisting of direct expansion, baking, frying, puffing, air impingement and microwaving.

6. The process of claim 5 wherein the starch phosphate monoester is present in the formulation in a weight percent of from about 0.1% to about 50%.

7. The process of claim 6 wherein the starch phosphate monoester is present in the formulation in a weight percent of from about 1% to about 25%.

8. The process of claim 6 wherein the starch phosphate monoester is present in the formulation in a weight percent of from about 5% to about 20%.

9. A formulation containing a starch phosphate monoester prepared by
   (a) impregnating a starch with a phosphate reagent to form an impregnated starch;
   (b) drying the impregnated starch to a virtually anhydrous state; and
   (c) heating to form a starch phosphate monoester.

10. An expanded product containing the formulation of claim 9.

11. The expanded product of claim 10 wherein the product is a food selected from the group consisting of pasta, pet food, breakfast cereal and snacks.

12. The expanded food product of claim 11 wherein the formulation contains a starch phosphate monoester in a weight percent of from about 0.1% to about 50% based on the formulation.

13. The expanded food product of claim 12 wherein the formulation contains a starch phosphate monoester in a weight percent of from about 1% to about 25% based on the formulation.

14. The expanded food product of claim 13 wherein the formulation contains a starch phosphate monoester in a weight percent of from about 5% to about 20% based on the formulation.

15. An expansion aid for use in food comprising a starch phosphate monoester.

16. The expansion aid of claim 15 wherein the starch phosphate monoester is prepared by
   (a) impregnating a starch with a phosphate reagent to form an impregnated starch;
   (b) drying the impregnated starch to a virtually anhydrous state; and
   (c) heating to form a starch phosphate monoester.

17. The method of using the expansion aid of claim 15 for expanding food.

18. The process of claim 3 further comprising adding an oligosaccharide to the impregnated starch.

* * * * *